United States Patent
Cohen et al.

(10) Patent No.: US 7,657,654 B2
(45) Date of Patent: Feb. 2, 2010

(54) HASHING ASSIST FOR NETWORK PROCESSORS

(75) Inventors: Earl T. Cohen, Fremont, CA (US);
Ibrahim Delibalta, Fremont, CA (US);
Jonathan Rosen, Cary, NC (US)

(73) Assignee: Cisco Technologies, Inc., San Jose, CA (US)

( * ) Notice: Subject to any disclaimer, the term of this patent is extended or adjusted under 35 U.S.C. 154(b) by 667 days.

(21) Appl. No.: 11/189,584

(22) Filed: Jul. 25, 2005

(65) Prior Publication Data

US 2007/0022084 A1    Jan. 25, 2007

(51) Int. Cl.
*G06F 15/173* (2006.01)
*G06F 15/167* (2006.01)
*G06F 9/26* (2006.01)

(52) U.S. Cl. .................. 709/243; 709/216; 711/216
(58) Field of Classification Search .................. 709/243
See application file for complete search history.

(56) References Cited

U.S. PATENT DOCUMENTS 6,289,375 B1 *  9/2001  Knight et al. ............... 709/217
6,389,513 B1 *  5/2002  Closson ...................... 711/129
6,434,662 B1 *  8/2002  Greene et al. ............... 711/108
6,795,850 B2 *  9/2004  Wu et al. .................... 709/213
2003/0223424 A1   12/2003  Anderson et al.
2005/0240595 A1 * 10/2005  Chandrasekaran .......... 707/10

OTHER PUBLICATIONS

Scott, Eric Et Al., "The BlackWidow High-Radix Clos Network," Computer Architecture, 2006, 33rd International Symposium on Boston, MA, USA, Jun. 17-21, 2006, pp. 16-27.
Anonymous: "DMail Utilities Download Page" Internet Article, Jan. 18, 2001, pp. 1-7, XP002419468, URL:http://web.archive.org/web/20010118224700/http://www.netwinsite.com/dmail/utils p. 6, last line—p. 7, last line.
Anonymous: The DMail General Configuration Settings, XP-002419467, 14 pages, http://web.archive.org/web/20010105001000/http://netwinsite.com/dmail/dm_set.htm.

* cited by examiner

*Primary Examiner*—Ario Etienne
*Assistant Examiner*—Blake Rubin
(74) *Attorney, Agent, or Firm*—Marger Johnson & McCollom, P.C.

(57) ABSTRACT

A resource unit has a request interface to allow the unit to receive a request and associated data. The resource unit also has a hashing engine to create a hash of the associated data, a modulo engine to create a modulus result, a read engine to perform a memory read, and a results interface to allow the device to return results.

27 Claims, 2 Drawing Sheets

HASHING ASSIST FOR NETWORK PROCESSORS

BACKGROUND

With the increasing use of packet-based transmissions, many network devices such as switches and routers now use network processors. Network processors may be thought of as general purpose processors with special features or architectures to enhance and/or to optimize packet processing within networks. These processors are typically adapted to be more flexible and more easily programmable with regard to their packet processing features.

Much of the work of network processors involves activities such as accessing data structures for a particular data flow through the network device. They may also determine which of a set of parallel interfaces should receive packets from a particular input or corresponding to a particular flow. For example, a packet enters the network device and the processor needs to determine to which flow that packet belongs. This involves a cluster of information such as the source address of the packet, the destination address, etc.

This cluster of information is used to access static or dynamic per-flow state and other information such as a table of input interface attributes etc. for whatever entities inside the network device are involved in the flow for that packet. Reducing this cluster of information down to a more manageable size is useful to speed up access of the information needed to route the packet on its way. For example, ten or more bytes of source address, destination address, and protocol information might be reduced to a three-byte key which could be used to access state information for that particular flow.

This reduction is generally accomplished using hashing and modulo functions, in which a hash of the information is further reduced modulo the size of a table, and is then used as the access key to the table. However, hashing, particularly high-quality hashing which distributes the data sufficiently randomly across the desired address space, may be very time-consuming and require either more circuitry which raises costs, or more processor cycles which lowers performance.

In addition, many network processors may not have division units used to carry out the modulo reduction of the hash result. Division is generally an expensive operation to implement in hardware, uses too many cycles to be implemented efficiently in software, and is not generally needed for any packet-processing operations other than modulo reduction of the hash result. Therefore, network processor architectures usually do not include division capabilities.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
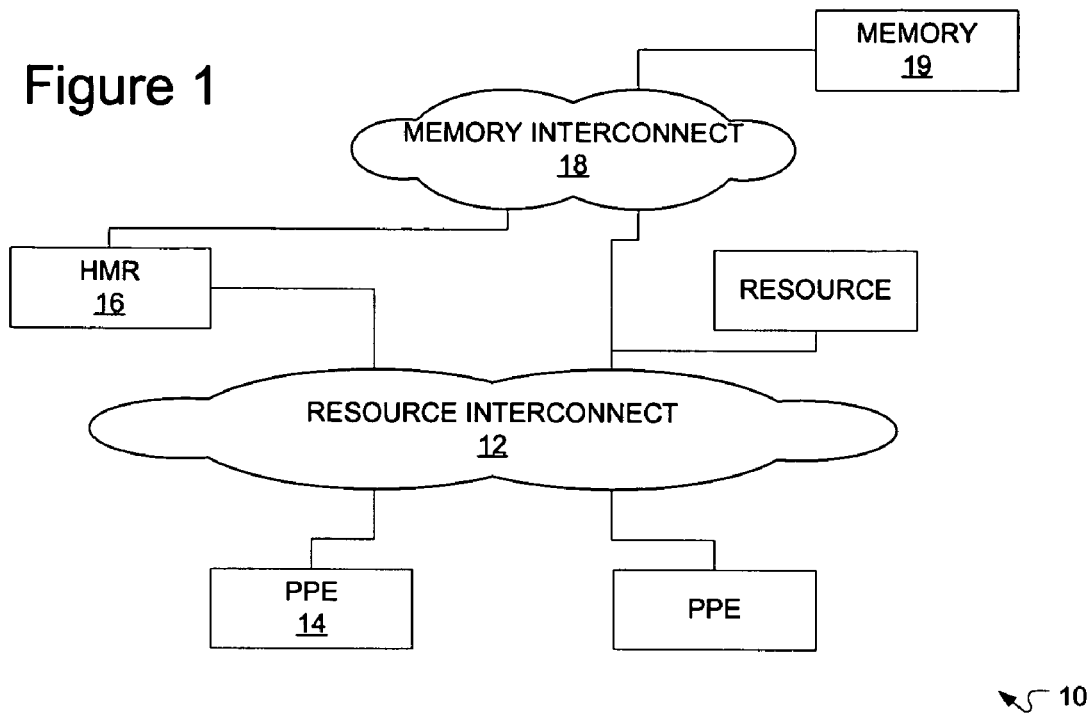
FIG. 1 shows an embodiment of a network processor architecture having a hash-mod-read resource unit.

FIG. 1 shows an embodiment of a network processor 10 having a hash-mod-read resource unit. The network processor is only one embodiment in which this unit may be used and is only discussed here to provide a framework for assistance in understanding the embodiments of the invention. The network processor 10 has a resource interconnect 12 that allows the packet processing elements, or processors, such as 14 to communicate with various resources such as the hash-mod-read (HMR) resource unit 16. Other resources may exist, including a lock request controller, discussed in more detail below.

A memory interconnect 18 may be provided to allow the resource unit 16 to perform memory accesses to the memory 19 as needed depending upon the request. In various embodiments, the memory 19 could be a dedicated memory for the resource unit 16, or it could be a general-purpose memory such as DRAM which is shared by the processing elements 14 through the resource interconnect 12. These memories could be on-chip or off-chip.

In other embodiments, the resource unit 16 could access the memory 19 via the resource interconnect 12, rather than over a dedicated connection as shown in FIG. 1. The resource unit is a logical 'device' formed out of hardware circuitry. For example, the modulo engine within the HMR resource unit may be an integer divider.

When a packet processing element such as 14 needs to perform a hash, it transmits a request through the resource interconnect 12 to the HMR resource unit 16. The request may include a request type, as well as a fixed or a variable amount of information to be hashed, a size for the variable amount of information, a reduction modulus, and a base address. The information accompanying the request will be referred to as the request information. The fixed or variable amount of information to be hashed, along with the size if the amount is variable, is referred to here as the associated data and is included in the request information. The HMR resource unit performs the requested operation or operations and returns results as a response to the request.

Figure 2:
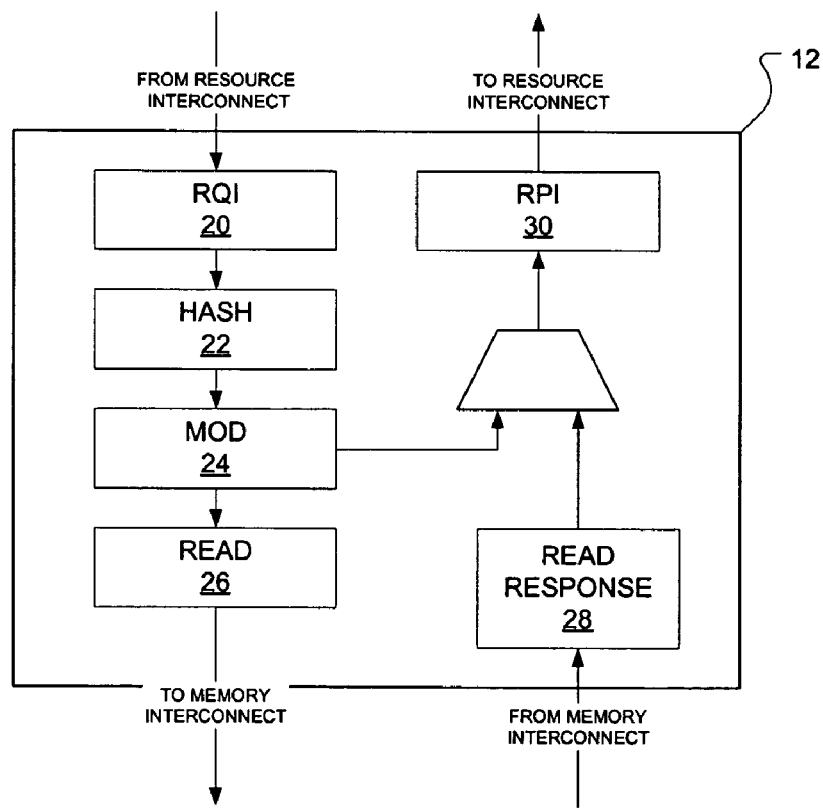
FIG. 2 shows an embodiment of a hash-mod-read resource unit.

A more detailed view of one embodiment of the HMR resource unit 12 is shown in FIG. 2. The HMR unit has a resource interconnect request interface (RQI) 20 that allows the resource unit to receive the request and the associated data. The request contains the parameters of the desired operation or operations, as will be discussed in more detail further. In the embodiment shown in FIG. 2, the read engine is bypassed explicitly. In other embodiments, the read engine could be bypassed by issuing a dummy read. In one embodiment, the resource unit may perform a hash only, a hash and modulo reduction, a modulo reduction only, a modulo reduction and a read, a hash and a read, or a hash, modulo reduction and a read, or just a read.

In one embodiment, if hashing is to occur, this is done first as hashing reduces the size of the associated data to more manageable proportions. If hashing is to be done, execution of the operation begins by sending the associated data to a hash engine 22. If a hash is not to be performed, the associated data would, in some embodiments, bypass the hash engine 22 and go directly to the modulo engine 24.

Hashing is a known art, and various embodiments of the hash engine could be used in the spirit of this invention. One technique which has desirable trade-offs between hardware cost and hash quality is the use of a CRC (cyclic redundancy check). CRCs provide a good, pseudo-random distribution of the keys—a one-bit change in the associated data can result in a large change in the resulting key. Still other embodiments might implement the hash engine as a processor or as a micro-coded engine.

In some embodiments, the operation type includes information about the type of hash to be done, and the hash engine implements multiple hashing algorithms. In some embodiments, the hash engine could be fully pipelined, accepting one new operation every cycle. In other embodiments, the hash engine could be implemented as set of parallel hash processors, in which case its throughput might be more limited.

As mentioned above, hashing provides a means to reduce the key size used to access a data structure of some kind, such as a table or a memory. If the size of the associated data is 800 bits, for example, there is not enough memory anywhere to store tables having 800-bit keys. For example, a table with 32-bit (four byte) entries using an 800-bit key would require 2802 bytes of storage. If instead a hash is created from those 800 bits, it could reduce the 800 bits to, for example, 32 bits, and a modulo 220 reduction could then reduce the resulting key to only 20 bits. These 20 bits could then be used to index into a table of 108-byte entries, where the entries are the four original bytes, plus four bytes for a "next" pointer to link any colliding entries, plus the 800 bits (100 bytes) of associated data corresponding to that entry to disambiguate any collisions. The total required size is now less than 2^27 bytes, which is quite practical.

Hashing is a many-to-one operation, so there may be more than one set of associated data which produces the same hashed key. When multiple sets of associated data map to the same key, a key is sometimes referred to as a 'hash bucket' because multiple sets of associated data end up in the same bucket. In some implementations, these items are formed into a 'collision chain' of entries that is linked by a "next" pointer. This collision chain can then be 'walked' one result at a time to find the desired entry among the set of entries that have the same key. Each element in the chain must store the original, associated data which created it, allowing comparisons to determine which entry, if any, in the collision chain corresponds to the desired associated data.

An advantage of this approach is that the processor only has to search one bucket to find the result, rather than the entire table or memory. The search problem is reduced from searching a very large table, to searching a much smaller number of colliding entries. A good hashing function would minimize the number of colliding entries, particularly when given sets of associated data that might be very "close," for example, only differing in one bit. CRCs can provide quite acceptable hashing functions in this regard.

If a hash is not to be performed, the associated data is passed to the modulo engine 24, either untouched through paths in the hash engine or directly from the RQI interface bypassing the hash engine, along with the modulus denominator. In these bypass cases where the hash is not done, in some embodiments the size of the associated data might be restricted to be no more than the size of the normal output of the hash engine. Examples of processes that may perform a modulo function and not a hash may include identification of a pseudo-random link over which to send information, or selecting one from a small number of interfaces that are sending packets to a particular source destination, or constructing a key when the associated data is already smaller than the size normally produced by the hash engine.

The modulo engine 24 could be implemented in a variety of ways. For example, in various embodiments it could be an integer divider, or it could use a table look-up, or approximate inverse, scheme optionally followed by fix-up or correction steps, such as Newton-Raphson iteration. In some embodiments, the modulo engine could be fully pipelined, accepting one new operation every cycle, or in other embodiments it might be composed of one or more parallel engines that are not fully pipelined and thus have throughput limitations.

It must be noted that the term 'modulo' is used to refer to the operation, function or circuit that performs this operation, and 'modulus' and 'modulus result' are used to refer to the arguments and results of the operation.

If a read is to be performed, the results of the modulo reduction are used to access a memory through the memory interconnect via a read engine 26, and the read results are returned as part of the results transmitted back to the requesting packet processing element. Similar to the way in which the hash engine 22 might be bypassed if it was not to be used for a given operation type, the modulo engine 24 could be bypassed either directly, or in some embodiments just by setting the modulus denominator to 1.

Some embodiments might bypass both the hash engine and the modulo engine and, for some operation types, only use the read engine 26. In some embodiments, the read engine just does a simple, single read of the memory at an address determined by adding the base address from the request to the result obtained from the modulo engine and/or the hash engine. This is referred to here as a simple read.

In other embodiments, the read engine could also do a hash table "walk" by comparing a portion of the result of a first, simple read with the associated data from the request. If the associated data does not match and the read result contains a non-null "next" pointer, the process follows this pointer to the next element in the collision chain and repeats the comparison. In this fashion, some embodiments could implement the entire hash table search process in the resource.

In other embodiments, the hash table search might involve additional operations to acquire a semaphore, also called a lock, associated with the hash table or with this access thereto. There might be one or more locks to be used, one used in the event of a miss, and one used in the event of a hit, and the address or location of these locks could be part of the corresponding data in the request. These locks might be cleared after the read engine completes its work, or they may be held on behalf of the requesting processor, which would then be responsible for releasing them. The read engine 26 could be implemented as a hardware engine, or it might be a specialized processor or a micro-coded engine.

The results of the modulo reduction may be the modulus result alone when no hashing is done or a reduced hash. Therefore, the results returned may be just the hash created by hashing the associated data; a hash upon which has been performed a modulo reduction, referred to here as a reduced hash; the result of a modulo reduction by itself, referred to here as a reduction or reduction result; a hash with read results; a reduction with read results; and a reduced hash with read results. Other combinations of results, including returning multiple of these results, may be desirable in other embodiments and these are only intended as examples of the possible results.

As mentioned above, the results returned depend upon the operations requested. The following discussion is merely one example of request parameters and is in no way intended to limit the scope of the invention. If one were to assume that the hashing engine uses cyclical redundancy check (CRC) hashing with polynomials, for example, including a CRC polynomial type field in the request, the value of the field could indicate whether hashing is required, and if so, what CRC polynomial or other hashing function to use. Similarly, setting a mod denominator to 0 or non-zero could determine whether or not modulo reduction is desired. Similarly, a read field that may designate the size of the data to be read could be set to 0 or to the size desired, depending upon whether read results are to be returned or not. In other embodiments, which combination of operations is to be determined might be encoded in the operation type.

Figure 3:
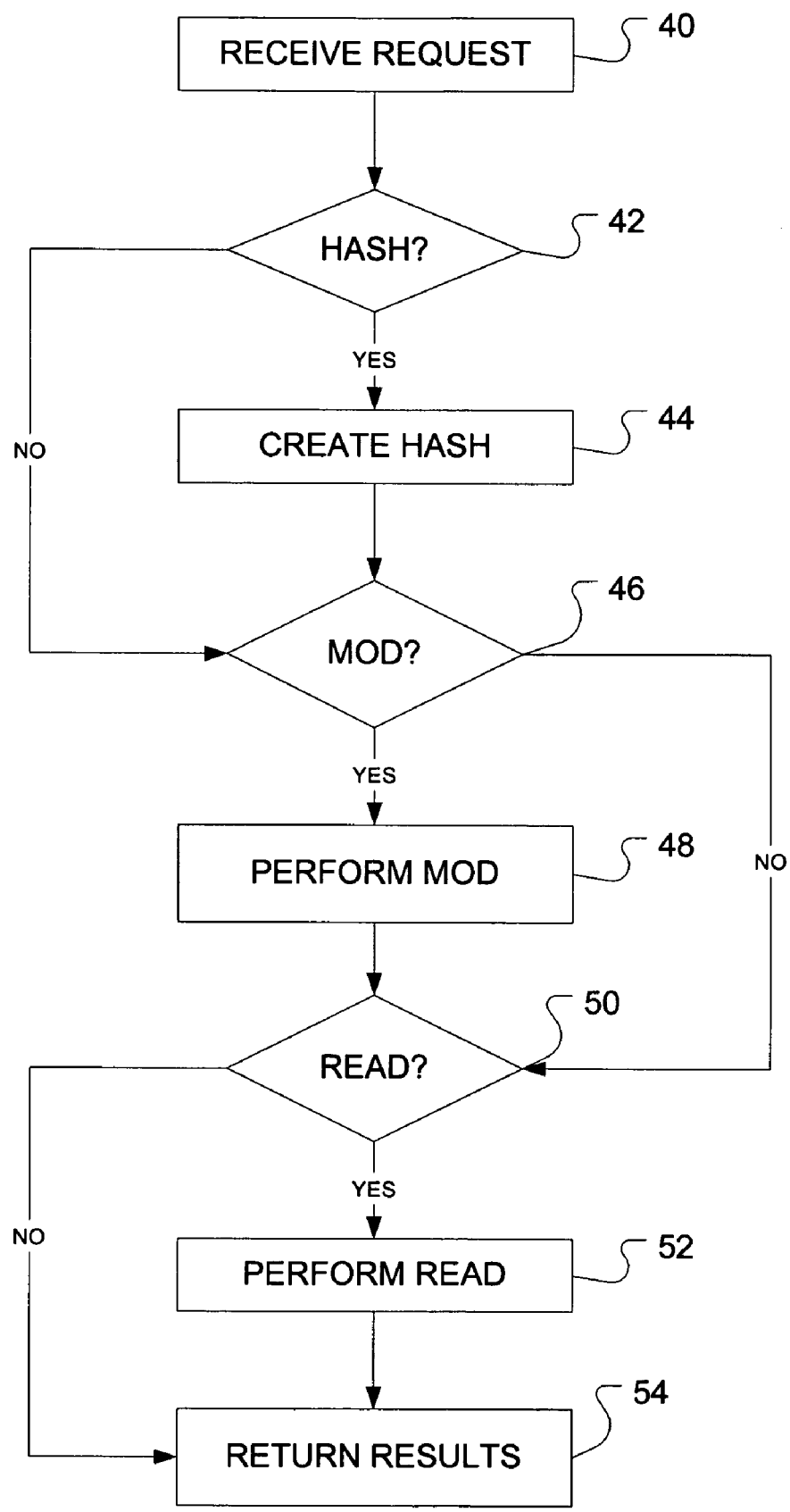
FIG. 3 shows a flowchart of an embodiment of operation of a hash-mod-read resource unit.

The operation of the resource unit would be based upon the parameters set in the request, such as those examples described above. A flowchart of an embodiment to operate an HMR resource unit is shown in FIG. 3. At 40, the request and associated data is received. At 42, whether hashing is to occur is determined. If hashing is to be performed, the process moves to 44 where the hash is created.

If hashing is not desired, the process skips the hashing and move directly to 46, where it is determined whether a modulo reduction occurs. If the modulo reduction is not desired, the process moves to 50. If modulo reduction is desired, the reduction is performed at 48. At 52, the decision is made whether to perform a read. If a read is not desired, the process returns the results at 54. If a read is desired, the memory is accessed. In one embodiment the memory is accessed using a base address transmitted with the request added to the hash or the modulus result as the address of an initial read at 52. Not shown is the embodiments where the read engine might iteratively walk a hash chain.

The results returned will depend upon the path taken. As mentioned above, the results could be a hash, a reduced hash, a reduced hash and read results, a hash and read results, a modulus result, a modulus and read results, or just read results. Each of this possible results may comprise at least a portion of the results returned.

By coupling the HMR resource unit to the memory system in a network processor, and returning the contents of a memory location at a base address offset by a modulus result, hashed or not, the HMR unit effectively performs a hash table look-up in one single operation from the perspective of the requesting thread. If the read engine also detects hash collisions and walks the hash chain in the event of such collisions, the entire hash search is implemented by the HMR resource unit.

A thread is a particular process flow on the packet processing element. Several hundred cycles of computation, plus latencies for one or more memory accesses, that would otherwise be necessary for these operations are converted into one resource access. Without the HMR resource, one resource access would be required just to access the memory for the simple read portion of this operation.

With pipelining employed in the hardware used to perform the hash and modulo operations, the resource unit could run fast enough to handle requests from many threads. In one embodiment, a pipelined HMR resource unit can support more than 200 threads.

Other variations and modifications are possible. The hashing could be implemented in some other hashing function rather than CRCs. The resource unit could implement many different types of hash functions, selectable as part of the request. The hash engine could implement different sizes of hash functions, such as 32-bit, 16-bit, etc.

The modulus result need not be the same size as the hash result, meaning that the dividend and the divisor do not have to be the same size. In most instances, a 16-bit modulus will be sufficient for most purposes and a 24-bit modulus is sufficient for even enormous hash tables.

The associated data, the data being hashed, may be fixed or variable in length. In some network processors, the processor allows variable length requests, thereby allowing variable lengths of data to be hashed.

The modulo reduction may be done in various ways. An embodiment mentioned above was an integer divider. A table look-up may be used to approximate the division. The division could be performed as repeated subtraction. Other division approaches could be used as well.

Using a memory look-up is merely one example of a coupled operation. One or more coupled operations may exist. Another example is a lock request to a lock resource. The lock request could be made only if there was a collision in the hash bucket returned by the memory access. In this case, other information in the request, such as a lock identifier (ID), would allow the read engine, upon detection of a hash collision which does not appear in the chain that is walked, to request a lock, using the given lock ID, and perhaps even install the new entry in to the collision chain. In an embodiment such as this, the HMR resource could have connections, either directly or through the resource interconnect, to other resources, such as a lock resource.

In another embodiment, the HMR need not be coupled to the network processor; it could reside in the memory system instead. Another embodiment could have multiple HMR resources, perhaps all the same, or perhaps each implementing different hashing functions or understanding how to walk different types of hash collision chains or other structures.

Thus, although there has been described to this point a particular embodiment for a method and apparatus for a hash-mod-read resource it is not intended that such specific references be considered as limitations upon the scope of this invention except in-so-far as set forth in the following claims.

What is claimed is:

1. A resource unit, comprising:
    a request interface configured to receive a request from a packet processor, wherein the request includes associated data, a request type identifier, a reduction modulus, and a base address, the associated data including a variable amount of information and a size identifier indicating a size of the variable amount of information;
    a hashing engine to create a hash of the information responsive to the request type identifier included in the request;
    a modulo engine to create a modulus result of the information responsive to the request type identifier and the reduction modulus included in the request;
    a read engine to perform a memory read and create a read result using the information responsive to the request type identifier and the base address included in the request; and
    a results interface configured to provide a result to the packet processor comprising at least one of the hash, the modulus result, and the read result;
    wherein the hashing engine and the modulo engine are communicatively coupled and the modulo engine is further configured to create the modulus result using the hash output from the hashing engine.

2. The resource unit of claim 1, the modulo engine further comprising at least one from the group consisting of: an integer divider, a table look-up approximation, and a repeatable subtraction unit.

3. The resource unit of claim 1, the hashing engine further to use cyclical redundancy check hashing.

4. The resource unit of claim 1, the hashing engine to perform multiple types and sizes of hashing functions, selectable by the request type identifier included in the request.

5. The resource unit of claim 1, the read engine further to perform a simple read at an address offset from the base address included in the request by an amount computed from at least one of the hash engine and the modulo engine.

6. The resource unit of claim 1, the read engine to perform a walk of a collision chain.

7. The resource unit of claim 1, wherein the hashing engine is communicatively coupled to the results interface such that the hash is provided as at least a portion of the result.

8. The resource unit of claim 1, wherein the modulo engine is communicatively coupled to the results interface such that the modulus result is provided as at least a portion of the result.

9. The resource unit of claim 1, wherein the read engine interface is communicatively coupled to the results interface such that the read result is provided as at least a portion of the result.

10. The resource unit of claim 1, wherein the modulo engine is configured to create the modulus result using the hash output from the hashing engine and the result comprises only the modulus result.

11. The resource unit of claim 1, wherein the read engine is configured to create the read result using the modulus result output from the modulo engine and the result comprises only the read result.

12. A network processor, comprising:
    at least one packet processing element;
    a resource unit comprising:
        a request interface configured to receive a request from a packet processor, wherein the request includes associated data, a request type identifier, a reduction modulus, and a base address, the associated data including a variable amount of information and a size identifier indicating a size of the variable amount of information;
        a hashing engine to create a hash of the information responsive to the request type identifier included in the request;
        a modulo engine to create a modulus result of the information responsive to the request type identifier and the reduction modulus included in the request;
        a read engine to perform a memory read and create a read result using the information responsive to the request type identifier and the base address included in the request;
        a results interface configured to provide a result to the packet processor comprising at least one of the hash, the modulus result, and the read result, wherein the hashing engine and the modulo engine are communicatively coupled and the modulo engine is further configured to create the modulus result using the hash output from the hashing engine; and
    a resource interconnect to allow the resource unit to receive a request at the request interface from the packet processing element and to return results through the results interface, the request including associated data and at least one of a request type, a reduction modulus, and a base address, the associated data including at least one of a fixed amount of information, a variable amount of information, and a size of the variable amount of information.

13. The network processor of claim 12, further comprising a memory.

14. The network processor of claim 13, the network processor further comprising a memory interconnect coupled to the resource unit to allow the resource unit to access the memory.

15. The network processor of claim 14, the memory coupled to the resource interconnect to allow the packet processing element access to the memory.

16. The network processor of claim 13, the memory coupled to the resource interconnect to allow access to the memory.

17. The network processor of claim 12 at least one packet processing element further comprising multiple packet processing elements and the resource unit further to handle multiple requests from the multiple packet processing elements.

18. The network processor of claim 12, the resource unit being coupled to a lock request controller.

19. The network processor of claim 18, the lock request controller further comprising a resource unit.

20. A method of processing a request at a resource unit, comprising:
    receiving a request from a packet processor, wherein the request includes associated data, a request type identifier, a reduction modulus, and a base address, the associated data including a variable amount of information and a size identifier indicating a size of the variable amount of information;
    determining if hashing is to be performed on the associated data to create a hash responsive to the request type identifier included in the request;
    creating a hash of the information based on the determining if hashing is to be performed;
    determining if modulo reduction is to be performed on at least one of the associated data and the hash to create a modulus result responsive to the request type identifier and the reduction modulus included in the request;
    creating a modulus result of the information using the hash based on the determining if modulo reduction is to be performed;
    determining if a read is to be performed on at least one of the associated data, the hash, and the modulus result to produce read results responsive to the request type identifier and the base address included in the request;
    performing a memory read to create a read result based on the determining if a read is to be performed; and
    returning results of the request to the packet processor.

21. The method of claim 20, receiving a request and request information further comprising receiving a request and request information including at least one of a lock location, a lock identifier and a lock address.

22. The method of claim 20, returning results of the request further comprising returning at least one of the group consisting of: a hash, a reduced hash, a hash and read results, a reduced hash and read results, modulus results, a modulus result and read results, and read results.

23. A resource unit comprising:
    means for receiving a request from a packet processor, the request including associated data, a request type identifier, a reduction modulus, and a base address, the associated data including a variable amount of information and a size identifier indicating a size of the variable amount of information;
    means for performing a hash function on the associated data to create a hash responsive to the request type identifier included in the request;
    means for performing a modulo reduction to created a modulus result responsive to the request type identifier and the reduction modulus included in the request;
    means for reading from a memory using the information responsive to the request type identifier and the base address included in the request to create a read result; and
    means for returning results to the packet processor as a response to the request, the results comprising at least one of the hash, the modulus result, and the read result, wherein the means for performing the hash function and the means for performing the modulo reduction are communicatively coupled and wherein the means for performing the modulo reduction is further configured to create the modulus result using the hash.

24. The resource unit of claim 23, the means for performing a hash further comprising performing a cyclic redundancy check hash.

25. The resource unit of claim 23, the means for performing a modulo reduction further comprising at least one selected from the group consisting of: an integer divider, a table look-up approximation, and a repeated subtraction unit.

26. The resource unit of claim 23, the means for reading from a memory further comprising a memory interconnect.

27. The resource unit of claim 23, the means for reading from a memory further comprising a resource interconnect.

* * * * *

UNITED STATES PATENT AND TRADEMARK OFFICE
CERTIFICATE OF CORRECTION

PATENT NO. : 7,657,654 B2 Page 1 of 1
APPLICATION NO. : 11/189584
DATED : February 2, 2010
INVENTOR(S) : Cohen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 888 days.

Signed and Sealed this

Twenty-eighth Day of December, 2010

David J. Kappos
*Director of the United States Patent and Trademark Office*